United States Patent
Kim et al.

(10) Patent No.: US 12,216,540 B2
(45) Date of Patent: Feb. 4, 2025

(54) SEMICONDUCTOR CHIP FOR CORRECTING ALIGNED ERROR, SEMICONDUCTOR SYSTEM FOR CORRECTING ALIGNED ERROR, AND METHOD FOR CORRECTING ALIGNED ERROR

(71) Applicant: Research & Business Foundation SUNGKYUNKWAN UNIVERSITY, Suwon-si (KR)

(72) Inventors: Jung Rae Kim, Suwon-si (KR); Sang Hyo Kim, Suwon-si (KR); Seokin Hong, Suwon-si (KR); Yuseok Song, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 18/139,440

(22) Filed: Apr. 26, 2023

(65) Prior Publication Data

US 2023/0342246 A1    Oct. 26, 2023

(30) Foreign Application Priority Data

Apr. 26, 2022   (KR) .................. 10-2022-0051613

(51) Int. Cl.
*G06F 11/10* (2006.01)
*G06F 11/07* (2006.01)

(52) U.S. Cl.
CPC ...... *G06F 11/1068* (2013.01); *G06F 11/0784* (2013.01); *G06F 11/1004* (2013.01)

(58) Field of Classification Search
None
See application file for complete search history.

(56) References Cited

U.S. PATENT DOCUMENTS

| | | | |
|---|---|---|---|
| 9,417,956 B2* | 8/2016 | Sakai | G06F 11/1012 |
| 11,462,292 B1* | 10/2022 | Kim | H03M 13/1168 |
| 2007/0110188 A1* | 5/2007 | Esumi | H03M 13/6343 375/324 |
| 2019/0042369 A1* | 2/2019 | Deutsch | G06F 3/0673 |
| 2021/0191810 A1* | 6/2021 | Cho | H03M 13/05 |
| 2021/0200630 A1* | 7/2021 | Ishikawa | G11C 11/4097 |
| 2021/0224156 A1* | 7/2021 | Cho | G06F 11/1076 |

* cited by examiner

*Primary Examiner* — Daniel F. McMahon
(74) *Attorney, Agent, or Firm* — NSIP Law

(57) ABSTRACT

A semiconductor chip for correcting an aligned error comprises a memory array is provided. The semiconductor chip includes a transceiver circuit and an Error Correction Code (ECC) circuit. The ECC circuit is configured to receive target data to be encoded, encode the target data by multiplying a generator matrix of a previously generated ECC by the target data, store the encoded target data in the memory array, check a data transformed from the encoded target data, and generate an error corrected data by correcting only a single error of the transformed data and an adjacent error that does not exceed a first value boundary of a predetermined number of bits by using a parity check matrix of the ECC, and output the error corrected data.

16 Claims, 7 Drawing Sheets

FIG.3

|   |   |   | 310 |   |   |   |   |   |   |   |   | 350 |   |   |   |
|---|---|---|---|---|---|---|---|---|---|---|---|---|---|---|---|
| 1 | 0 | 0 | 0 | 0 | 0 | 0 | 0 | | 1 | 0 | 0 | 0 | 0 | 0 | 0 |
| 0 | 1 | 0 | 0 | 0 | 0 | 0 | 0 | | 1 | 1 | 0 | 0 | 0 | 0 | 0 |
| 0 | 0 | 1 | 0 | 0 | 0 | 0 | 0 | | 0 | 1 | 1 | 0 | 0 | 0 | 0 |
| 0 | 0 | 0 | 1 | 0 | 0 | 0 | 0 | | 0 | 0 | 1 | 1 | 0 | 0 | 0 |
| 0 | 0 | 0 | 0 | 1 | 0 | 0 | 0 | | 0 | 0 | 0 | 1 | 1 | 0 | 0 |
| 0 | 0 | 0 | 0 | 0 | 1 | 0 | 0 | | 0 | 0 | 0 | 0 | 1 | 1 | 0 |
| 0 | 0 | 0 | 0 | 0 | 0 | 1 | 0 | | 0 | 0 | 0 | 0 | 0 | 1 | 1 |
| 0 | 0 | 0 | 0 | 0 | 0 | 0 | 1 | | 0 | 0 | 0 | 0 | 0 | 0 | 1 |

FIG.4

| vector | multiplicative poly. (0x14D) | multiplicative poly. (0x165) |
|---|---|---|
| 00000001 | $\alpha^0$ | $\alpha^0$ |
| 00000010 | $\alpha^1$ | $\alpha^1$ |
| 00000100 | $\alpha^2$ | $\alpha^2$ |
| 00001000 | $\alpha^3$ | $\alpha^3$ |
| 00010000 | $\alpha^4$ | $\alpha^4$ |
| 00100000 | $\alpha^5$ | $\alpha^5$ |
| 01000000 | $\alpha^6$ | $\alpha^6$ |
| 10000000 | $\alpha^7$ | $\alpha^7$ |
| 00000011 | $\alpha^{23}$ | $\alpha^{233}$ |
| 00000110 | $\alpha^{24}$ | $\alpha^{234}$ |
| 00001100 | $\alpha^{25}$ | $\alpha^{235}$ |
| 00011000 | $\alpha^{26}$ | $\alpha^{236}$ |
| 00110000 | $\alpha^{27}$ | $\alpha^{237}$ |
| 01100000 | $\alpha^{28}$ | $\alpha^{238}$ |
| 11000000 | $\alpha^{29}$ | $\alpha^{239}$ |
| . . . | . . . | . . . |

*FIG.5*

|  | (136,128) SEC | (137,128) SEC-DED-DAEC | (136,128) SEC-BADAEC |
|---|---|---|---|
| NUMBER OF PARITY BIT | 8 | 9 | 8 |
| Area overhead | 6.25% | 7.03% | 6.25% |
| NUMBER OF CORRECTABLE ERROR PATTERNS | 136 | 255 | 255 |

SEMICONDUCTOR CHIP FOR CORRECTING ALIGNED ERROR, SEMICONDUCTOR SYSTEM FOR CORRECTING ALIGNED ERROR, AND METHOD FOR CORRECTING ALIGNED ERROR

TECHNICAL FIELD

The present disclosure relates to an aligned error correcting memory chip, an aligned error correcting memory system, and an aligned error correcting semiconductor chip.

This work was supported by Institute of Information & communications Technology Planning & Evaluation (IITP) grant funded by Korea government (MSIT)(No. 2021-0-00863-001, Development of intelligent In-Memory error correction device for high reliability memory).

BACKGROUND

The error correction code can correct errors in the transformed transmission data and restore original transmission data. The error correction code is sometimes used to protect data from noise generated in the process of transmitting or receiving data in a communication system, and it is also used to protect data stored in memory semiconductors such as SRAM (Static Random Access Memory), MRAM (Magnetic Random Access Memory), DRAM (Dynamic Random Access Memory), and the like. When an error correction code is used in a random access memory, it is selected and used from a number of error correction codes in consideration of data protection level, area overhead, execution speed, energy consumption, etc.

A linear binary code may be determined by a parity check matrix. Accordingly, the error correction capability of the linear binary code is determined according to the properties of the parity check matrix. Among linear binary codes, a single error correction code can correct a single error when a single error exists in the transformed transmission data. To correct a single error, the properties of the parity check matrix of a linear binary code are: first, all columns of the parity check matrix must be nonzero, and second, all columns of the parity check matrix must be independent. Here, the fact that all columns are independent means that all columns have different values.

When the protection level is increased by increasing the number of parity bits of the error correction code, problems such as an increase in area burden or an increase in delay time in encoding and decoding processes may occur. Therefore, in the memory semiconductor, a single error correction code having a small area burden and low encoding and decoding complexity is used as an error correction code. However, since a single error correction code can correct only a single error, there is a problem in that data with multiple errors cannot be restored.

A SEC (Single Error Correction)-DED (Double Error Detection)-DAEC (double adjacent error correction) code is an error correction code that corrects the adjacent error when errors appear adjacent to each other in the transformed data. Therefore, a stronger error correction effect is provided. However, the SEC-DED-DAEC code can detect that an error has occurred, but cannot correct the error, when two errors are not adjacent to each other in the transformed data.

On the other hand, the SEC-DED-DAEC code requires an additional number of parity bits than a single error correction code, and there is a problem that miscorrection may exist between non-adjacent double errors in transformed data.

SUMMARY

An object of the present disclosure is to provide a method and an apparatus for correcting not only a single error but also an error arranged in units of nibbles or bytes without increasing the number of parity bits of an error correction code in a memory.

However, the problem to be solved by the present disclosure is not limited to those mentioned above, and another problem to be solved that is not mentioned can be clearly understood by those skilled in the art from the description below.

In accordance with an aspect of the present disclosure, there is provided a semiconductor chip, the semiconductor chip may comprise: a transceiver circuit; and an Error Correction Code (ECC) circuit, wherein the ECC circuit is configured to: receive target data to be encoded, encode the target data by multiplying a generator matrix of a previously generated ECC by the target data, store the encoded target data in the memory array, check a data transformed from the encoded target data, and generate an error corrected data by correcting only a single error of the transformed data and an adjacent error that does not exceed a first value boundary of a predetermined number of bits by using a parity check matrix of the ECC, and output the error corrected data.

The error correction code includes raw data bits of 128 bits, and check bits of 8 bits, the first value is 8 bits, and the ECC circuit is configured to correct a plurality of single errors and a plurality of double adjacent errors within the first value.

The error correction code includes raw data bits of 64 bits, and check bits of 8 bits, the first value is 4 bits, and the ECC circuit is configured to correct a plurality of single errors, a plurality of double adjacent errors and triplet adjacent errors within the first value.

The error correction code is generated by selecting a plurality of column-power conversion methods based on the first value, generating a plurality of independence determination columns including addition columns obtained through the sum of components of each column of the unit matrix whose size is the first value and adjacent columns of the unit matrix, converting each independence determination column into a plurality of powers using the plurality of column-power conversion method, determining a final conversion method for which all of the converted powers satisfy independence for each column-power conversion method, and generating the parity check matrix of the ECC and the generator matrix based on the determined final conversion method.

The transformed data generating object includes a memory configured to write the encoded target data or read the transformed data in which the encoded target data is transformed by an operating environment.

The transformed data generating object includes the transceiver circuit configured to receive the transformed data in which the target data is transformed through communication.

In accordance with another aspect of the present disclosure, there is provided a semiconductor system, the system may comprise: a memory chip including a first memory, configured to write coded data to the first memory or read transformed data in which the coded data is transformed by an operating environment of the first memory; and a control chip including an Error Correction Code(ECC) circuit, wherein the ECC circuit is configured to obtain data, encode the obtained data by multiplying the obtained data by a generator matrix of a previously generated ECC, store the encoded data in the memory chip, obtain the transformed data from the first memory of the memory chip, and generate an error corrected data by correcting only single errors of the transformed data and adjacent errors that do not exceed a first value boundary of a predetermined number of bits by using a parity check matrix of the ECC and output the error corrected data.

The ECC includes raw data bits of 128 bits, and check bits of 8 bits, the first value is 8 bits, and the ECC circuit is configured to correct a plurality of single errors and a plurality of double adjacent errors within the first value.

The ECC includes raw data bits of 64 bits, and check bits of 8 bits, the first value is 4 bits, and the ECC circuit is configured to correct a plurality of single errors, a plurality of double adjacent errors and triplet adjacent errors within the first value.

The error correction code is generated by selecting a plurality of column-power conversion methods based on the first value, generating a plurality of independence determination columns including addition columns obtained through the sum of components of each column of the unit matrix whose size is the first value and adjacent columns of the unit matrix, converting each independence determination column into a plurality of powers using the plurality of column-power conversion method, determining a final conversion method for which all of the converted powers satisfy independence for each column-power conversion method, and generating the parity check matrix of the ECC and the generator matrix based on the determined final conversion method.

In accordance with another aspect of the present disclosure, there is provided method for correcting an aligned error performed by a semiconductor system including a memory chip and a control chip including an ECC circuit to control the memory chip, the method may comprise: obtaining target data to be encoded, and encoding the target data by multiplying a generator matrix of a previously generated ECC by the target data; storing the encoded target data in the first memory of the memory chip; reading the encoded target data from the first memory of the memory chip, and checking a data transformed from the encoded target data; and generating an error corrected data by correcting only single errors of the transformed data and adjacent errors that does not exceed a first value boundary of a predetermined number of bits by using a parity check matrix of the ECC and outputting the error corrected data.

The ECC includes raw data bits of 128 bits, and check bits of 8 bits, the first value is 8 bits, and the correcting only single errors of the transformed data and adjacent errors includes correcting a plurality of single errors and a plurality of double adjacent errors within the first value.

The ECC includes raw data bits of 64 bits, and check bits of 8 bits, the first value is 4 bits, and the correcting only single errors of the transformed data and adjacent errors includes correcting a plurality of single errors, a plurality of double adjacent errors and triplet adjacent errors within the first value.

The ECC is generated by selecting a plurality of column-power conversion methods based on the first value, generating a plurality of independence determination columns including addition columns obtained through the sum of components of each column of the unit matrix whose size is the first value and adjacent columns of the unit matrix, converting each independence determination column into a plurality of powers using the plurality of column-power conversion method, determining a final conversion method for which all of the converted powers satisfy independence for each column-power conversion method, and generating the parity check matrix of the ECC and the generator matrix based on the determined final conversion method.

The checking of the transformed data includes reading the transformed data in which the encoded target data is transformed by an operating environment of the first memory of the memory chip.

The checking of the transformed data includes receiving the transformed data in which the target data is transformed through communication through a transceiver.

According to an embodiment of the present disclosure, a single error and a nibble or byte aligned double adjacent errors of transformed data can be corrected without increasing the number of parity bits of an error correction code in a random access memory.

In addition, according to an embodiment of the present disclosure, the number of correctable errors for transformed data is increased, but the number of parity bits is not increased, thereby reducing the area burden and reducing the cost burden in memory semiconductor design.

The effects obtainable in the embodiments of the present disclosure are not limited to the effects mentioned above, and other effects not mentioned may be clearly understood by those skilled in the art from the description below.

BRIEF DESCRIPTION OF THE DRAWINGS

FIG. 3 is a unit matrix and an adjacent matrix for generating an aligned error correction code according to an embodiment of the present disclosure.

FIG. 4 is a table showing a column-power conversion method according to an embodiment of the present disclosure.

FIG. 5 is a table comparing doubling error correction codes with other codes according to an embodiment of the present disclosure.

DETAILED DESCRIPTION

Figure 1:
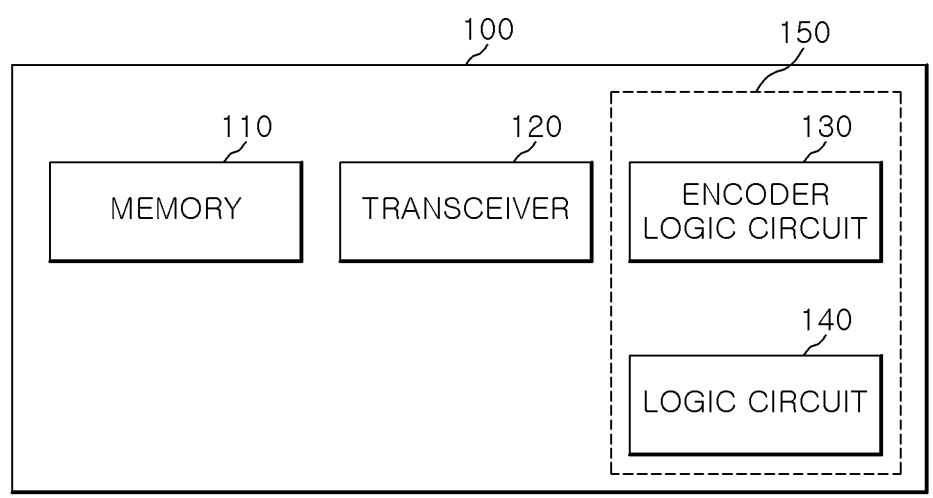
FIG. 1 is a block diagram illustrating a memory chip for correcting aligned errors according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a block diagram illustrating a semiconductor chip for correcting aligned errors according to an embodiment of the present disclosure.

Referring to FIG. 1, according to an embodiment, an aligned error correction semiconductor chip 100 may include a memory 110, a transceiver 120, an encoder logic circuit 130, and a logic circuit 140. However, the configuration of the aligned error correction semiconductor chip 100 is not limited thereto. For example, according to embodiments, the aligned error correction semiconductor chip 100 may include only the memory 110, the encoder logic circuit 130, and the logic circuit 140. In this case, since the memory and the circuit for error correction exist in the same semiconductor chip, the aligned error correction semiconductor chip 100 may not include the transceiver 120 for receiving data.

Also, the aligned error correction semiconductor chip 100 may include a Error Correction Code (ECC) circuit 150 which includes the encoder logic circuit 130 and the logic circuit 140.

Hereinafter, a method of correcting a single error and an aligned adjacent error by the aligned error correction semiconductor chip 100 will be described.

In the present specification, for convenience of description, an example in which the memory 110, the encoder logic circuit 130, and the logic circuit 140 are implemented as a single chip is described in the aligned error correction semiconductor chip 100, but the present disclosure is not limited thereto. That is, according to embodiments, it may be implemented as a memory system including a memory 110 chip and a separate control chip, where the control chip may include a processor which includes the encoder logic circuit 130 and the logic circuit 140.

Here, the memory 110 may include a random access memory, and it can be used for a main memory device of a computer, temporary loading of application programs, and temporary storage of data, etc., as a memory capable of reading stored information and storing other information. Also, the random access memory may include DRAM, SRAM, MRAM, and the like.

Data stored in the memory 110 may be binary data having 0 or 1. In addition, the memory 110 may obtain data to be stored and perform an operation of writing or reading data to the memory 110. To this end, the random access memory may include a cell array, a core, peripheral circuits, etc.

When data stored in the memory 110 is transformed, the aligned error correction semiconductor chip 100 may restore the transformed data using a pre-generated aligned error correction code.

To this end, the aligned error correction code may include a generator matrix and a parity check matrix for encoding. A method of generating an aligned error correction code will be described later.

In addition, the aligned error correction semiconductor chip 100 may obtain data to be stored in the memory 110 from an external device that is distinct from the memory 110. Here, the external device may be a device that transmits data to be stored in the memory 110. For example, the external device may be a central processing unit (CPU) including a memory controller.

The transceiver 120 may communicate with an external device and may transmit data to or receive data from the external device. Here, as a method for the transceiver 120 to communicate with the external device, any known method may be used.

Here, since the data may be transformed during the communication process while transmitting and receiving data with the external device by the transceiver 120, the aligned error correction semiconductor chip 100 may restore the transformed data using an aligned error correction code.

The aligned error correction semiconductor chip 100 may encode the obtained data by using the generator matrix of the aligned error correction code previously generated by the aligned error correction code generation device 200 of FIG. 2 to be described later, and may store the data in the memory 110. The aligned error correction semiconductor chip 100 may decode data transformed by the memory 110 using the previously generated aligned error correction code. In this case, the aligned error correction semiconductor chip 100 may serve to correct errors (on-die ECC) inside the aligned error correction semiconductor chip 100, through a process of encoding and decoding data using the aligned error correction code generated by the aligned error correction code generation device 200 of FIG. 2 to be described later.

The encoder logic circuit 130 may obtain data and encode the obtained data by multiplying the obtained data by generated generator matrix of the previously generated aligned error correction code. Encoded data may be stored in the memory 110, and the encoded data may be transformed according to an operating environment of the memory 110.

Since the data stored in the memory 110 may be transformed by the operating environment of the memory such as heat and external stimulation, the aligned error correction semiconductor chip 100 may restore the original data by correcting the transformed data through the process of encoding and decoding the data to be stored using the aligned error correction code previously generated by the aligned error correction code generation device 200 of FIG. 2 to be described later.

Here, the operating environment of the memory may include at least one of row hammering, process defect, and large leakage current due to high temperature.

Here, row hammering refers to an operating environment in which electrical interference that can change memory bits by repeatedly accessing the same row affects memory adjacent to the corresponding memory row and causes bit flip where 0 and 1 are reversed. In addition, a process defect refers to an operating environment in which a bit flip occurs for stored data due to a defect occurring in a process including designing and manufacturing the memory. In addition, a large leakage current due to a high temperature refers to an operating environment in which a large leakage current is generated in a memory due to a high temperature and thus a bit flip occurs for stored data.

However, the operating environment of the memory is not limited to the above environment, and includes known environments in which data stored in the memory 110 may be transformed.

The logic circuit 140 may obtain transformed data in which data encoded by the operating environment of the memory 110 is transformed, and correct at least one adjacent error within the first value which is a single error of the transformed data and a predetermined number of bits using a parity check matrix of an aligned error correction code.

As a result, it is possible to correct adjacent errors except single errors of data transformed by the operating environment of the memory 110 and adjacent errors exceeding a specific multiple boundary.

Hereinafter, a method for generating an aligned error correction code by the aligned error correction code generation device 200 will be described in detail.

Figure 2:
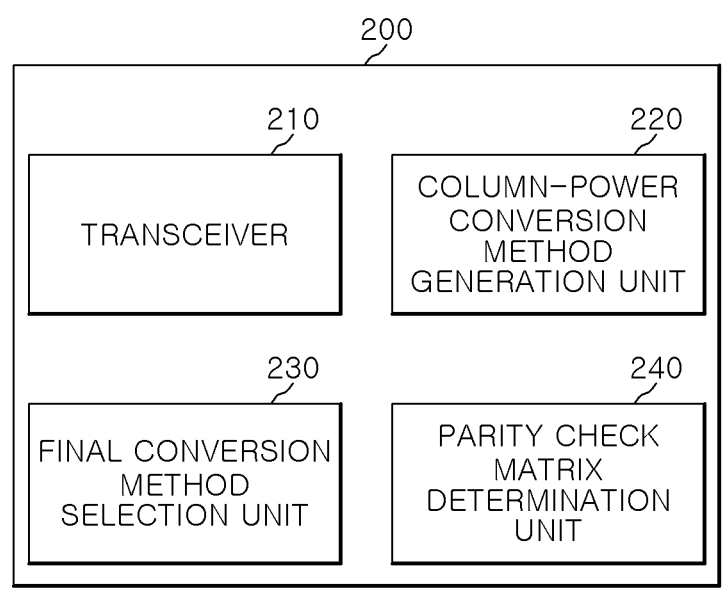
FIG. 2 is a block diagram illustrating an apparatus for generating an aligned error correction code according to an embodiment of the present disclosure.

FIG. 2 is a block diagram illustrating an apparatus for generating an aligned error correction code according to an embodiment of the present disclosure.

Referring further to FIG. 2, the aligned error correction code generation device 200 may include a transceiver 210, a column-power conversion method generation unit 220, a final conversion method selection unit 230, and a parity check matrix determination unit 240.

The transceiver 210 may obtain the preset number of parity bits, the length of an aligned error correction code, and data to be stored in the memory. A method for the transceiver 210 to obtain the number of parity bits, the length of the aligned error correction code, and the data to be stored may be received using wired or wireless communication. A method for the transceiver 210 to obtain data or the like is not limited thereto.

The aligned error correction code generated by the aligned error correction code generation device 200 may include a generator matrix for encoding data and a parity check matrix. Here, the sizes of the generator matrix and the parity check matrix are determined by the size k of raw data and the number of parity bits n-k.

According to an embodiment, the number of original data bits of an aligned error correction code capable of correcting double-adjacent errors in units of bytes as well as single errors may be 128 bits, and the number of parity bits may be 8 bits. In addition, the aligned error correction code is aligned on an 8-bit boundary and can correct double-adjacency errors other than double-adjacent errors that cross an 8-bit boundary.

In addition, according to an embodiment, the number of original data bits of an aligned error correction code capable of correcting single errors as well as double-adjacent errors and triple-adjacent errors in nibble units may be 64 bits, and the number of parity bits may be 8 bits. In addition, the aligned error correction code is aligned on a 4-bit boundary and can correct double-adjacent errors other than double-adjacent errors that cross a 4-bit boundary.

In this case, the generator matrix G of the aligned error correction code may have the form of $[I_k|P]$. Here, $I_k$ denotes a unit matrix with k rows and k columns, P denotes a parity matrix determined according to the property of an error correction code, and P may have k rows and n-k columns. When the generator matrix G is determined, the parity check matrix H for decoding data may be determined as $[P^T|I_{n-k}]$. Here, $P^T$ denotes a transposed matrix of P included in the generator matrix G, and $I_{n-k}$ denotes a unit matrix having n-k rows and n-k columns.

That is, the aligned error correction code generated by the aligned error correction code generation device 200 may vectorize data to be stored having a length k and encode it into data having a length of n by multiplying with a generator matrix G. Subsequently, the coded data having a length of n may be vectorized, and a result obtained by multiplying the coded data with the parity check matrix H may be compared with a syndrome to correct an error and restore original data.

Therefore, since the aligned error correction code can be defined as a generator matrix or a parity check matrix, in the present specification, the aligned error correction code generated by the aligned error correction code generation device 200 is described as the parity check matrix of the aligned error correction code.

According to the embodiment, the parity check matrix of the aligned error correction code generated by the aligned error correction code generation device 200 has the following four properties. The first property is that all columns of the parity check matrix are non-zero, the second property is that all columns are not equal to each other, the third property is that the sum of double-adjacent columns within all first lengths is not equal to each other, and the fourth property is that the sum of double-adjacent columns within all first lengths and all columns should not be equal to each other. When all properties are satisfied, all columns of the parity check matrix may be defined as satisfying independence.

Here, the first length is a length for the data to make the encoded length n divided by the first length. For example, the first length may be 8 bytes or 4 as the nibble unit length.

In FIGS. 3 to 5, for the aligned error correction code generated by aligned error correction code generation device 200, a case that the length of original data to be stored is 128 and the number of parity bits and the first length are 8 will be described as an example.

FIG. 3 is a unit matrix and an adjacent matrix for generating an aligned error correction code according to an embodiment of the present disclosure, and FIG. 4 is a table showing a column-power conversion method according to an embodiment of the present disclosure.

Referring to FIGS. 3 and 4, the column-power conversion method generation unit 220 may determine an aligned error correction code using the unit matrix 310 having 8 rows and 8 columns and the adjacent matrix 350.

Here, the adjacent matrix 350 used by the column-power conversion method generation unit 220 has 8 rows and 7 columns in a way that the sum of the first and second columns of the unit matrix 310 as the first column, and the sum of the second and third columns as the second column.

Next, the final conversion method selection unit 230 may select the final conversion method by determining whether all columns satisfies independence for each column of the unit matrix 310 and the adjacent matrix 350 among the column-power conversion methods generated by the column-power conversion method generation unit 220.

To this end, according to an embodiment, the final conversion method selection unit 230 may select a plurality of column-power conversion methods based on the first value which is the preset number of parity bits. In this case, when the first value is a natural number n, the final conversion method selection unit 230 may select a method converting column vector into a power as the column-power conversion method using a primitive polynomial of a Galois Field (GF) GF($2^n$). Here, the primitive polynomial means a binary polynomial used for error detection in data transmission.

For example, when the first value is 8, since there are 16 primitive polynomials which are generated by the column-power conversion method generation unit 220, there are 16 methods for the column-power conversion methods. FIG. 4 shows a column-power conversion table for a first conversion of $x^8+x^6+x^3+x^2+1$, in which the primitive polynomial is 0x14D, and a second conversion of $x^8+x^6+x^5+x^2+1$, in which the primitive polynomial is 0x165, by the column-power conversion method generation unit 220. Referring to the column-power conversion table of FIG. 4, the column-power conversion method generation unit 220 may display power forms corresponding to all column vectors of the unit matrix and adjacent matrix of FIG. 4 as a table.

According to the embodiment, the final conversion method selection unit 230 may select the case that in which all powers satisfy independence as the final conversion method from among power forms in which all the column vectors of the unit matrix and the adjacent matrix are converted into power forms by each column-power conversion method.

The final conversion method selection unit 230 may select a conversion method in which all of the calculated values by modularly calculating the exponents of the plurality of converted powers have different values as the final conversion method, in order to determine whether the power form satisfies independence.

Here, the modular calculation may be a remainder calculation obtained by dividing the exponent of each power by a second value, which is a natural number less than twice the first value by one.

For example, in the case of the first conversion in FIG. 4, when all 15 columns are converted into powers, the exponents of each power are represented as a first set of {0,1,2,3,4,5,6,7,23,24,25,26,27,28,29}. If each element of the first set is modularly calculated with the second number of 15, since the elements of the first set all have different values as {0,1,2,3,4,5,6,7,8,9,10,11,12,13,14}, the conversion method for generating the first set can be selected as the final conversion method. When the 15 columns of the second conversion are converted into powers, the exponents of each power can be represented by the second set of {0,1,2,3,4,5,6,7,233,234,235,236,237,238.239}. In addition, if each element of the second set is modularly calculated with 15, since the elements of the second set all have different values as {0,1,2,3,4,5,6,7,8,9,10,11,12,13,14}, the conversion method for generating the second set can also be selected as the final conversion method.

According to the embodiment, when the final conversion method is selected by the final conversion method selection unit 230, the parity check matrix determination unit 240 may determine the parity check matrix by determining the plurality of sets included in the parity check matrix by expanding the set of exponents generated by the final conversion method.

In order to expand the set of exponents, the parity check matrix determination unit 240 may generate a plurality of sets while adding a multiple of the second number to each element for sets satisfying independence. Here, the number of sets generated by the final conversion method selection unit 230 may be one smaller than the quotient obtained by dividing the length of the encoded data by the first value. This is because there exists a set that satisfies independence before the expanded set.

In addition, the parity check matrix determination unit 240 may convert each set into a plurality of column groups using the selected final conversion method for the generated plurality of power sets, and arrange the converted plurality of column groups arbitrarily, thereby generating a parity check matrix of the aligned error correction code.

The parity check matrix determination unit 240 may determine the resultant value of the modular calculation of $2^n-1$ as the exponent of the power when the first value is a natural number n and the exponent of the power included in the plurality of power groups is greater than or equal to $2^n-1$ value, and may generate the plurality of power groups.

For example, if it is determined by the final conversion method selection unit 230 that the first set {0,1,2,3,4,5,6,7,23,24,25,26,27,28,29} satisfies the independence, the parity check matrix determination unit 240 may generate a plurality of sets by adding a multiple of 15 to each element of the first set. Here, the number of generated sets may be 16, one less than 17, which is a value obtained by dividing the length of the encoded data 136 by 8 which is the first value. That is, the parity check matrix determination unit 240 may generate 17 column sets that satisfying mutual independence. In this case, while adding a multiple of 15 to each element of the set, the exponent over 255 which is $2^8-1$ is replaced with the result value of the modular calculation with 255.

Subsequently, the parity check matrix determination unit 240 may determine a parity check matrix by randomly arranging the generated 17 column sets.

Also, the parity check matrix determiner 240 may generate a generator matrix using the generated parity check matrix.

FIG. 5 is a table comparing aligned error correction codes and other codes according to an embodiment of the present disclosure.

Referring further to FIG. 5, the SEC-BADAEC code generated by the aligned error correction code generation device 200 according to an embodiment of the present disclosure has the same number of parity bits and the same area burden as the conventional SEC code, but may dramatically increase the number of correctable error patterns.

In addition, the SEC-BADAEC code generated by the aligned error correction code generation device 200 according to the embodiment of the present disclosure has the same number of correctable error patterns as the conventional SEC-DED-DAEC code, but the area burden is reduced.

Figure 6:
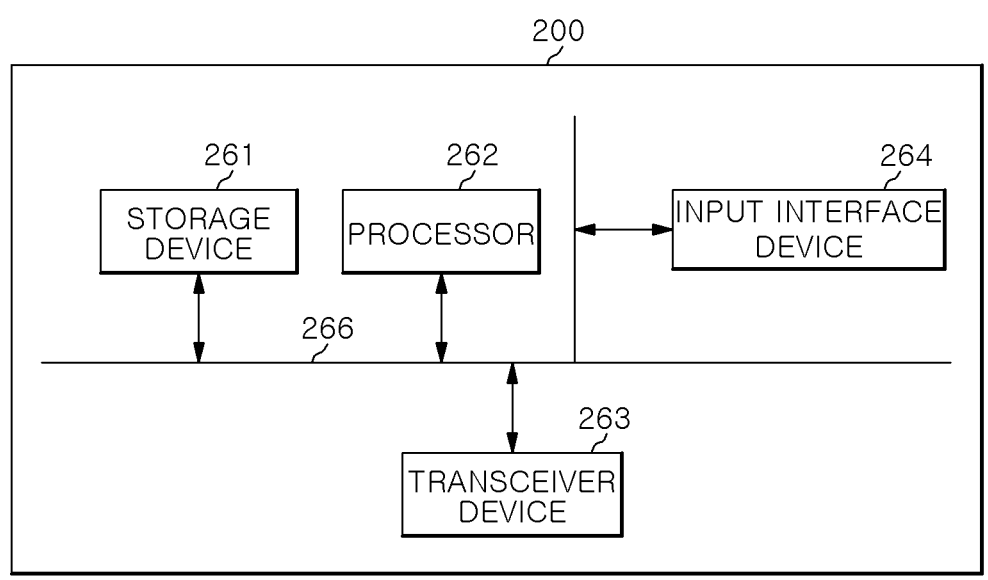
FIG. 6 is a block diagram for explaining an aligned error correction code generation device from a hardware point of view according to an embodiment of the present disclosure.

FIG. 6 is a block diagram for explaining an aligned error correction code generation device from a hardware point of view according to an embodiment of the present disclosure.

Referring further to FIG. 6, the aligned error correction code generation device 200 may include a storage device 261 for storing at least one command and a processor 262 for executing at least one command of the storage device 261, a transceiver device 263 and an input interface device 264.

Each of the components 261, 262, 263, 264, 265 included in the aligned error correction code generation device 200 may be connected by a data bus 266 to communicate with each other.

The storage device 261 may include at least one of a memory or a volatile storage medium and a non-volatile storage medium. For example, the storage device 261 may include at least one of a read only memory (ROM) and a random access memory (RAM).

The storage device 261 may further include at least one command to be executed by the processor 262 to be described later, and may store the number of parity bits, the length of the input data, the length of the encoded data, etc., input from the user in the input interface device 264, The processor 262 may mean a central processing unit (CPU), a graphics processing unit (GPU), a micro controller unit (MCU), or a dedicated processor on which methods according to embodiments of the present disclosure are performed.

As described above, the processor 262 may perform the functions of the column-power conversion method generation unit 220, the final conversion method selection unit 230, and the parity check matrix determination unit 240 by at least one program command stored in the storage device 261, and each of these may be stored in a memory in the form of at least one module and executed by the processor.

The transceiver device 263 may receive or transmit data from or to an internal device or an external device connected through communication, and may perform the function of the transceiver 210.

The input interface device 264 may receive at least one control signal or set value from the user. For example, the input interface device 264 may receive user input such as the number of parity bits, the length of input data, and the length of encoded data.

In the above, the aligned error correction code generation device 200 according to an embodiment of the present disclosure has been described. Hereinafter, an aligned error correction code generation method executed by a processor operation in the aligned error correction device according to an embodiment will be described.

Figure 7:
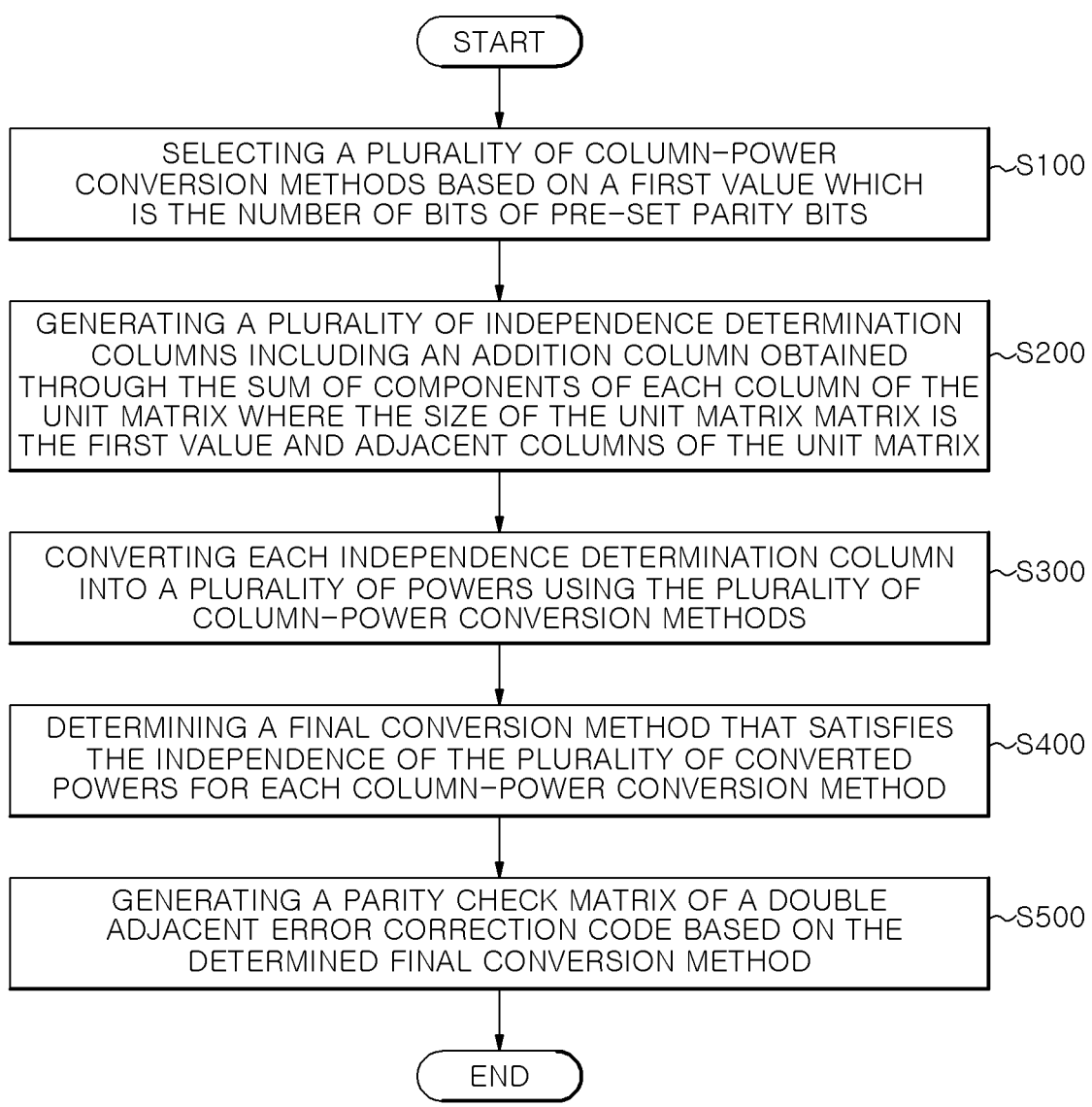
FIG. 7 is a flowchart of a method for generating an aligned error correction code according to an embodiment of the present disclosure.

FIG. 7 is a flowchart of a method for generating an aligned error correction code according to another embodiment of the present disclosure.

Referring further to FIG. 7, first, the transceiver device 263 may obtain a first value that is the number of bits of a preset parity bit, and the processor 262 may select a plurality of column-power conversion methods based on the obtained first value (S100).

Subsequently, the processor 262 may generate a plurality of independence determination columns including an addition column obtained by summing components of each column of the unit matrix having the first value and adjacent columns of the unit matrix (S200).

The processor 262 may convert each independence determination column into a plurality of powers using the plurality of column-power conversion methods (S300).

In addition, the processor 262 may determine a final conversion method in which all of the converted plural powers satisfy independence for each column-power conversion method (S400).

The processor 262 may generate a parity check matrix of the aligned error correction code based on the determined final conversion method (S500).

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A semiconductor chip for correcting an aligned error, the semiconductor chip comprising:
a memory array;
a transceiver circuit; and
an Error Correction Code (ECC) circuit,
wherein the ECC circuit is configured to:
receive target data to be encoded,
encode the target data by multiplying the target data by a generator matrix of an ECC which was generated previously, store the encoded target data in the memory array,
read the encoded target data from the memory array or transformed transmission data which was transformed by an operating environment of the memory array or transformed during transmitting or receiving data via the transceiver circuit, and
generate error corrected data by correcting a single error of the transformed data and a plurality of double adjacent errors that does not exceed a first value boundary of a predetermined number of bits by using a parity check matrix of the ECC, and
output the error corrected data.

2. The semiconductor chip of claim 1, wherein the ECC includes raw data bits of 128 bits, and check bits of 8 bits, wherein the first value boundary is 8 bits, and
wherein the ECC circuit is configured to correct a plurality of single errors and a plurality of double adjacent errors within the first value boundary.

3. The semiconductor chip of claim 1, wherein the ECC includes raw data bits of 64 bits, and check bits of 8 bits, wherein the first value boundary is 4 bits, and
wherein the ECC circuit is configured to correct a plurality of single errors, a plurality of double adjacent errors and triplet adjacent errors within the first value boundary.

4. The semiconductor chip of claim 1, wherein the ECC is generated by selecting a plurality of column-power conversion methods based on the first value boundary, generating a plurality of independence determination columns including addition columns obtained through the sum of components of each column of the unit matrix whose size is the first value boundary and adjacent columns of the unit matrix, converting each independence determination column into a plurality of powers using the plurality of column-power conversion method, determining a final conversion method for which all of the converted powers satisfy independence for each column-power conversion method, and generating the parity check matrix of the ECC and the generator matrix based on the determined final conversion method, wherein independence is satisfied when all columns have different values.

5. The semiconductor chip of claim 1, wherein the ECC circuit is configured to check the transformed data in the memory array configured to write the encoded target data or read the transformed data in which the encoded target data is transformed by an operating environment of the memory array.

6. The semiconductor chip of claim 1, wherein the ECC circuit is configured to check the transformed data in the transceiver circuit configured to receive the transformed data in which the target data is transformed through communication with the transceiver circuit.

7. A semiconductor system for correcting an aligned error, comprising:
a memory chip including a first memory, configured to write coded data to the first memory or read transformed transmission data in which the coded data is transformed by an operating environment of the first memory; and
a control chip including an Error Correction Code (ECC) circuit,
wherein the ECC circuit is configured to obtain data, encode the obtained data by multiplying the obtained data by a generator matrix of ECC which was generated previously, store the encoded target data in the memory chip, obtain the transformed transmission data from the first memory of the memory chip, and generate an error corrected data by correcting single errors of the transformed transmission data and a plurality of double adjacent errors that do not exceed a first value boundary of a predetermined number of bits by using a parity check matrix of the ECC and output the error corrected data.

8. The semiconductor system of claim 7, wherein the ECC includes raw data bits of 128 bits, and check bits of 8 bits, wherein the first value boundary is 8 bits, and
wherein the ECC circuit is configured to correct a plurality of single errors and a plurality of double adjacent errors within the first value boundary.

9. The semiconductor system of claim 7, wherein the ECC includes raw data bits of 64 bits, and check bits of 8 bits, wherein the first value boundary is 4 bits, and
wherein the ECC circuit is configured to correct a plurality of single errors, a plurality of double adjacent errors and triplet adjacent errors within the first value boundary.

10. The semiconductor system of claim 7, wherein the ECC is generated by selecting a plurality of column-power conversion methods based on the first value boundary, generating a plurality of independence determination columns including addition columns obtained through the sum of components of each column of the unit matrix whose size is the first value boundary and adjacent columns of the unit matrix, converting each independence determination column into a plurality of powers using the plurality of column-power conversion method, determining a final conversion method for which all of the converted powers satisfy independence for each column-power conversion method, and generating the parity check matrix of the ECC and the generator matrix based on the determined final conversion method, wherein independence is satisfied when all columns have different values.

11. A method for correcting an aligned error performed by a semiconductor system including a memory chip including a first memory, and a control chip including an Error Correction Code (ECC) circuit for controlling the memory chip, comprising:
obtaining target data to be encoded, and encoding the target data by multiplying a generator matrix of an ECC which was generated previously;
storing the encoded target data in the first memory of the memory chip;
reading the encoded target data from the first memory of the memory chip or reading transformed transmission data which was transformed during transmission; and
generating an error corrected data by correcting single errors of the transformed transmission data and a plurality of double adjacent errors that does not exceed a first value boundary of a predetermined number of bits by using a parity check matrix of the ECC and outputting the error corrected data.

12. The method of claim 11, wherein the ECC includes raw data bits of 128 bits, and check bits of 8 bits,
wherein the first value boundary is 8 bits, and
wherein the correcting single errors of the transformed transmission data and adjacent errors includes correcting a plurality of single errors and a plurality of double adjacent errors within the first value boundary.

13. The method of claim 11, wherein the ECC includes raw data bits of 64 bits, and check bits of 8 bits,
wherein the first value boundary is 4 bits, and
wherein correcting single errors of the transformed transmission data and adjacent errors includes correcting a plurality of single errors, a plurality of double adjacent errors and triplet adjacent errors within the first value boundary.

14. The method of claim 11, wherein the ECC is generated by selecting a plurality of column-power conversion methods based on the first value boundary, generating a plurality of independence determination columns including addition columns obtained through the sum of components of each column of the unit matrix whose size is the first value boundary and adjacent columns of the unit matrix, converting each independence determination column into a plurality of powers using the plurality of column-power conversion method, determining a final conversion method for which all of the converted powers satisfy independence for each column-power conversion method, and generating the parity check matrix of the ECC and the generator matrix based on the determined final conversion method, wherein independence is satisfied when all columns have different values.

15. The method of claim 11, wherein the checking of the transformed transmission data includes reading the transformed transmission data in which the encoded target data is transformed by an operating environment of the first memory of the memory chip.

16. The method of claim 11, wherein the checking of the transformed transmission data includes receiving the transformed transmission data in which the target data is transformed through communication through a transceiver.

* * * * *